(12) United States Patent
Korczyński

(10) Patent No.: US 11,078,931 B2
(45) Date of Patent: Aug. 3, 2021

(54) SERVO VALVE

(71) Applicant: Hamilton Sundstrand Corporation, Charlotte, NC (US)

(72) Inventor: Marcin Korczyński, Wrocław (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 24 days.

(21) Appl. No.: 16/516,447

(22) Filed: Jul. 19, 2019

(65) Prior Publication Data

US 2020/0025220 A1   Jan. 23, 2020

(30) Foreign Application Priority Data

Jul. 20, 2018   (EP) ................................... 18461587

(51) Int. Cl.
| | | |
|---|---|---|
| *F15B 13/04* | (2006.01) | |
| *F16K 11/07* | (2006.01) | |
| *F15B 13/043* | (2006.01) | |

(52) U.S. Cl.
CPC ...... *F15B 13/0438* (2013.01); *F16K 11/0708* (2013.01)

(58) Field of Classification Search
CPC .............. F15B 13/0438; F15B 13/0442; F15B 13/0435; F15B 13/0402; F15B 2013/008; F16K 11/0708; F16K 31/0603; Y10T 137/8671
See application file for complete search history.

(56) References Cited

U.S. PATENT DOCUMENTS

| | | | | |
|---|---|---|---|---|
| 2,094,926 A | * | 10/1937 | Irvin ....................... | F16K 31/34 137/625.69 |
| 3,282,168 A | * | 11/1966 | Hayner ..................... | F15B 9/00 91/420 |
| 3,719,199 A | * | 3/1973 | Mentink ............. | F16K 11/0712 137/269 |
| 4,873,948 A | * | 10/1989 | Richeson ................ | F01L 9/026 123/90.11 |

(Continued)

FOREIGN PATENT DOCUMENTS

| | | |
|---|---|---|
| CA | 2221667 A1 | 5/1999 |
| DE | 1650559 B1 | 2/1970 |
| FR | 1485048 A | 6/1967 |

OTHER PUBLICATIONS

European Search Report for Application No. 18461587.0 dated Jan. 25, 2019. 5 pages.

*Primary Examiner* — Kelsey E Cary
(74) *Attorney, Agent, or Firm* — Cantor Colburn LLP

(57) ABSTRACT

A servo valve comprises a valve housing, a cavity formed in the valve housing and defining a longitudinal axis (X), and a member disposed in the cavity and axially-moveable therein, wherein the member comprises a portion with first and second cylindrical sections having a first diameter (R1, R2), a central section located between the first and second cylindrical sections and having a second diameter (R3), and first and second frusto-conical sections connecting the first and second sections to the central section and forming respective first and second frusto-conical surfaces. A plurality of ports, each form a fluid passage through the valve housing and have first and second nozzles with first and second nozzle openings.

13 Claims, 5 Drawing Sheets

(56) References Cited

U.S. PATENT DOCUMENTS

| | | | | |
|---|---|---|---|---|
| 2002/0157709 A1* | 10/2002 | Fuhrmann | ............... | F15B 11/05 |
| | | | | 137/501 |
| 2003/0221731 A1* | 12/2003 | Ogura | ................... | F16K 27/041 |
| | | | | 137/625.69 |
| 2012/0012768 A1* | 1/2012 | Yahr | ................... | F15B 13/0444 |
| | | | | 251/129.11 |
| 2017/0097100 A1* | 4/2017 | Patterson | ................ | E21B 34/16 |

* cited by examiner

SERVO VALVE

FOREIGN PRIORITY

This application claims priority to European Patent Application No. 18461587.0 filed Jul. 20, 2018, the entire contents of which is incorporated herein by reference.

TECHNICAL AREA

The present disclosure relates to servo valves, and in particular spool servo valves. Such spool valves are often used in hydraulic systems for aerospace applications.

BACKGROUND

Servo valves are well-known in the art and can be used to control the flow of fluid, for example hydraulic fluid to an actuator or fuel flow to a combustor. Typically, a flapper is deflected by an armature connected to an electric motor away or towards nozzles, which control fluid flow to the spool valve. Deflection of the flapper can control the amount of fluid injected from the nozzles, and thus the amount of fluid communicated to the actuator via the spool valve. In this way, servo valves can allow precise control of actuator movement.

SUMMARY

In an aspect of the present disclosure, there is provided a servo valve comprising a valve housing, a cavity formed in the valve housing and defining a longitudinal axis, a member disposed in the cavity and axially-moveable therein, wherein the member comprises first and second cylindrical sections having a first diameter, a central section located between the first and second cylindrical sections and having a second diameter, and first and second frusto-conical sections connecting the first and second sections to the central section and forming respective first and second frusto-conical surfaces, wherein the member defines an annular channel radially between the member and the valve housing, and the annular channel is bounded by the first and second cylindrical sections, a plurality of ports, each forming a fluid passage through the valve housing in fluid communication with the annular channel, the plurality of ports comprising first and second ports each defining a diameter and having first and second nozzles with first and second nozzle openings for providing fluid communication between the annular channel and a spool, the first and second nozzle openings each having diameters smaller than the diameter of their respective port, wherein, in a first axial position of the member the second nozzle opening is at least substantially (i.e. substantially or fully) obstructed by the second frusto-conical surface and the first nozzle opening is at least substantially unobstructed by the first frusto-conical surface, and in a second axial position of the member the first nozzle opening is at least substantially obstructed by the first frusto-conical surface and the second nozzle opening is at least substantially unobstructed by the second frusto-conical surface.

In an embodiment of the above, the servo valve further comprises a solenoid having a central opening extending axially therethrough, the member comprising a further portion extending axially into the central opening, wherein the further portion comprises a ferromagnetic material such that actuation of the solenoid is configured to cause an axial movement of the member.

In an embodiment of any of the above, the cavity comprises a first cavity section axially adjacent to a second cavity section, wherein the solenoid is disposed in the first cavity section and the member portion is disposed in the second cavity section, the cavity defining a first opening at a first axial end of the valve housing, the valve further comprising a first cover plate sealing the first opening.

In an embodiment of any of the above, the servo valve further comprises a spring assembly on an axially-opposed side of the member section to the solenoid, the spring assembly having a spring member secured to an end of the member, and a retaining member securing the spring member to the valve housing.

In an embodiment of any of the above, the valve housing has a second axial end, the spring assembly disposed axially adjacent to the second axial end at an exterior of the valve housing and secured to an outer surface thereof, the valve further comprising a second cover plate with an axially-extending portion extending axially beyond the spring assembly and a radially-extending portion.

In an embodiment of any of the above, the cavity defines a cross-section with a constant radial size and the first and second sections of the member portion are slideably engaged to the valve housing.

In an embodiment of any of the above, the servo valve further comprises O-ring seals proximate the first and second sections of the member portion to sealingly engage the member and the valve housing.

In an embodiment of any of the above, one or more of the ports comprises a screen filter.

In an embodiment of any of the above, the valve is a fuel supply valve.

In an embodiment of any of the above, the valve is a pneumatic control valve.

In an embodiment of any of the above, the plurality of ports are substantially perpendicular to the longitudinal axis and/or extend parallel to each other.

In an embodiment of any of the above, the plurality of ports comprises a third port located axially between the first and second ports.

In an embodiment of any of the above, the servo valve further comprises a spool in fluid communication with at least one of the plurality of ports for controlling fluid flow to a component.

In another aspect of the disclosure, there is provided an assembly comprising the servo valve of any of the above embodiments, and a component in fluid communication with the spool.

In another aspect of the disclosure, there is a method of repairing a valve system comprising removing an existing valve and fitting the valve of any of the above embodiments

DETAILED DESCRIPTION OF THE FIGURES

Figure 1:
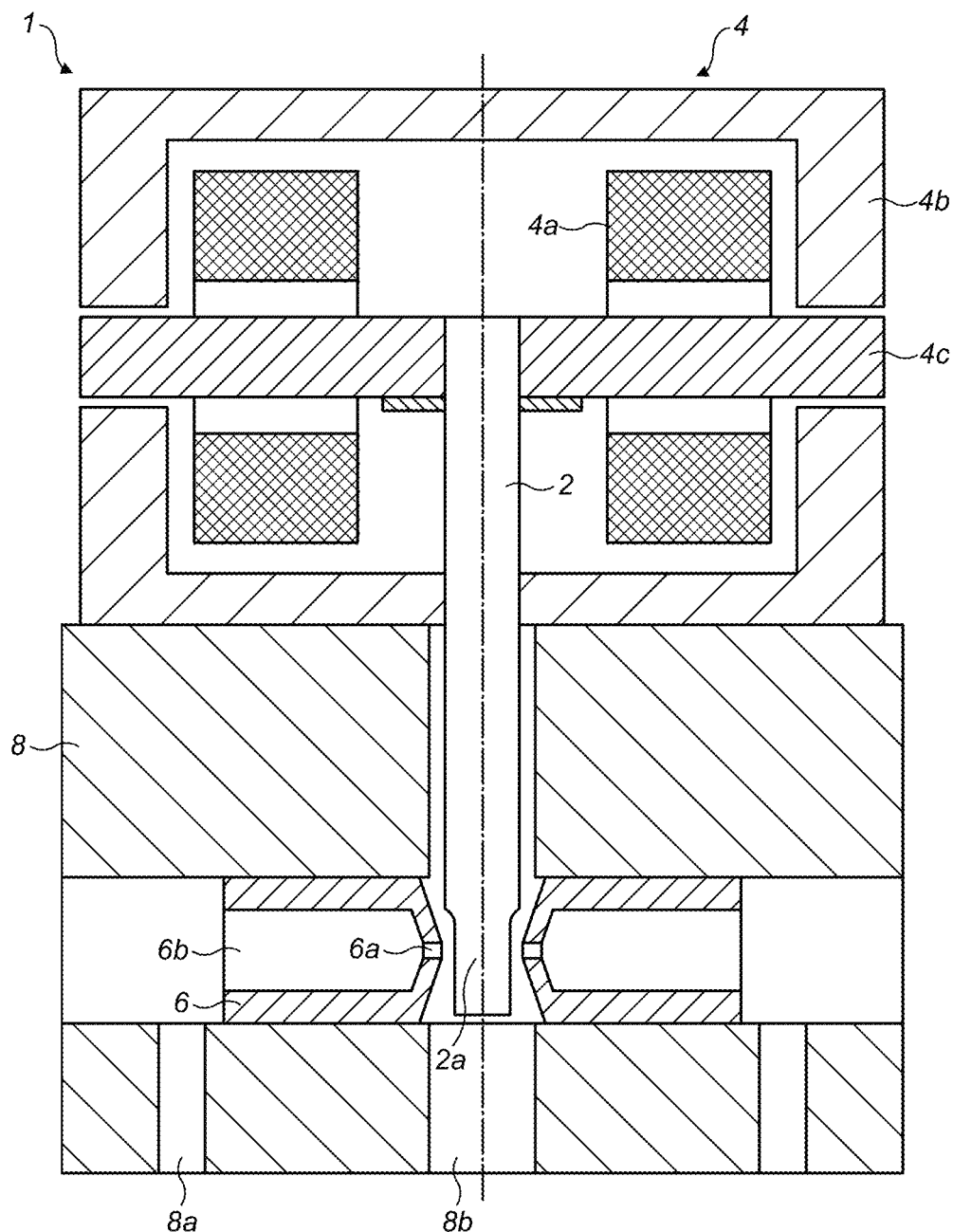
FIG. 1 shows a prior art servo valve.

With reference to FIG. 1, a prior art servo valve 1 is illustrated. Servo valve 1 comprises an electric motor 4, flapper 2, nozzles 6 and nozzle housing 8. The electric motor 4 comprises coils 4a, permanent magnets 4b and armature 4c. The coils 4a are in electrical communication with an electrical supply (not shown) and when activated, interact with the permanent magnets 4b to create movement of armature 4c, as is well-known in the art. Flapper 2 is attached to armature 4c, and is deflected by movement of the armature 4c. Nozzles 6 are housed within nozzle housing 8 via an interference fit and comprise a fluid outlet 6a and fluid inlet 6b. Housing 8 also has a port 8a, which allows communication of fluid to the nozzles 6.

The flapper 2 comprises a blocking element 2a at an end thereof which interacts with fluid outlets 6a of nozzles 6 to provide metering of fluid from the fluid outlets 6a to a fluid port 8b in the housing 8, which allows communication of metered fluid from the nozzles 6 to an actuator via a spool valve input (not shown). As is known in the art, the electric motor 4 is used to control deflection of the blocking element 2a and vary the fluid delivered to the actuator from nozzles 6, as required.

Figure 2:
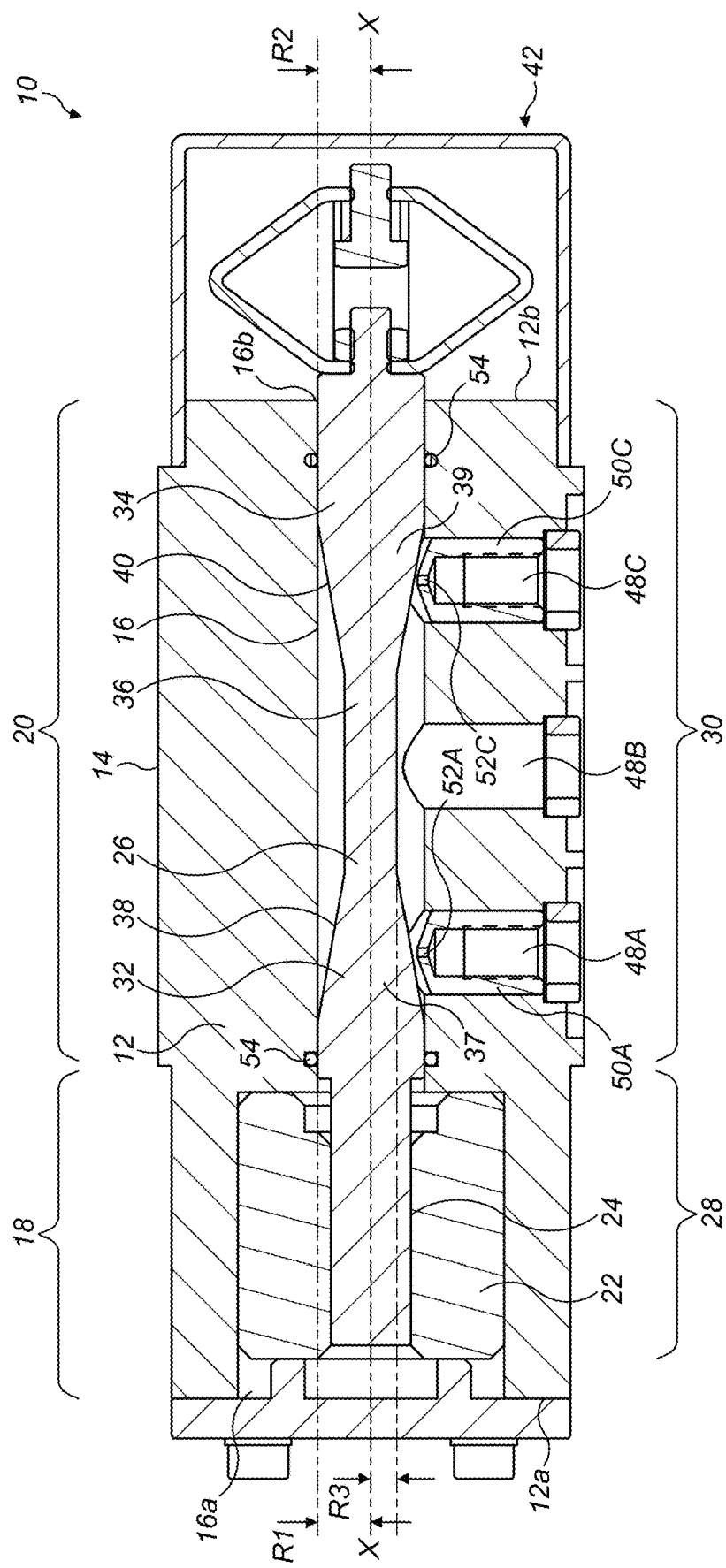
FIG. 2 shows a servo valve in accordance with the present disclosure.

FIG. 2 illustrates a servo valve 10 in accordance with the present disclosure. The valve comprises a valve housing 12 with an outer surface 14 and a cavity 16, the cavity 16 defining a longitudinal axis X through the valve housing 12. The valve housing 12 has first and second axial ends 12a, 12b, and the cavity 16 forms openings 16a, 16b in the outer surface 14 at the respective axial ends 12a, 12b.

The cavity 16 is notionally separated into first and second axial sections 18, 20. A solenoid 22 is disposed in the first section 18 of the cavity 16 in a press fit with the valve housing 12. The solenoid has a central opening 24 extending axially entirely therethrough. The solenoid 22 may be, for example, an annular solenoid forming a ring shape around the axis X.

An elongated member (or 'rod') 26 is also disposed in the cavity 16, extending along the axis X. A first portion 28 of the member 26 is disposed predominantly in the first section 18 of the cavity 16, extending axially into the central opening 24 of the solenoid 22. A second portion 30 of the member 26 is disposed in the second section 20 of the cavity 16. The second portion 30 forms a 'dual-conical' shape, which will be described in further detail below.

The member 26 is moveable within the cavity 16 between first and second axial positions. The first portion 28 of the member 26, which is disposed radially within the solenoid 22 as described above, comprises a ferromagnetic material. A current is passed through the solenoid 22 to induce a magnetic field. The interaction of the magnetic field and the ferromagnetic material causes an axial movement of the member 26 in a direction away from the solenoid 22 from the first to the second position.

Figure 3:
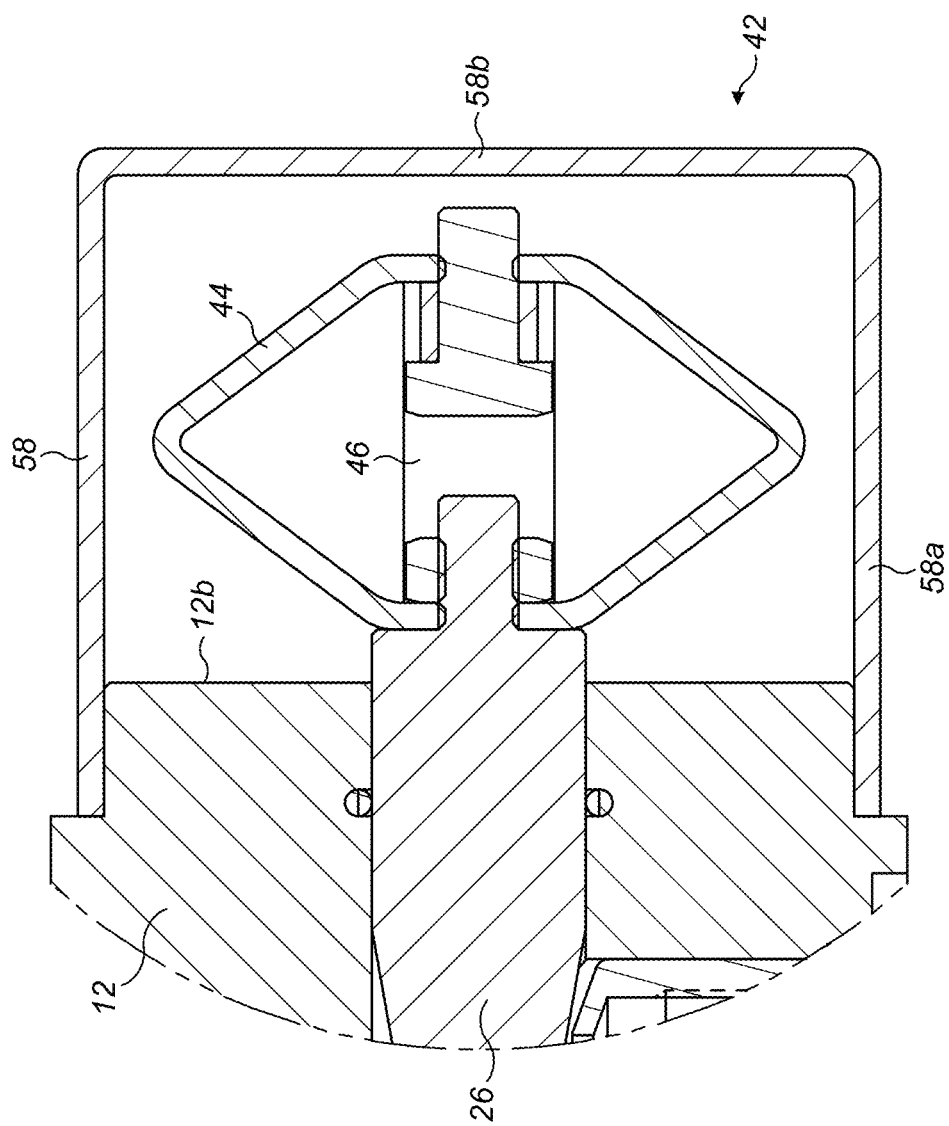
FIG. 3 shows an enlarged view of a portion of the servo valve of FIG. 2.

The servo valve 10 further comprises a spring assembly 42, shown in greater detail in FIG. 3. The spring assembly 42 is disposed on the outer surface 14 of the valve housing 12 at the second axial end 12b.

The spring assembly 42 comprises a spring member 44 and a retaining member 46. The spring member 44 comprises a relatively deformable, elastic material. The retaining member 46 is secured to the outer surface 14 of the valve housing 12. The spring member 44 is, in turn, secured to the retaining member 46.

The member 26 extends axially out of the valve housing 12 through the second cavity opening 16b. The member 26 is secured to the spring member 44 at an axial end 27 of the member 26. The second portion 30 of the member axially separates the end 27 from the first portion 28 of the member 26.

The valve housing 12, retaining member 46, spring member 44 and/or member 26 may be secured to one another as described above using any means. In the example shown, the respective components are secured by a nut-and-bolt connection.

The spring member 44 is substantially undeformed in the first axial position of the member 26. Upon operation of the solenoid 22 to move the member 26 from the first axial position to the second axial position, the spring member 44 is deformed, resulting in a reactive force acting against the force induced by the solenoid 22. When the solenoid 22 is deactivated, the spring member 44 forces the member 26 from the second axial position back to the first axial position.

The force induced by the magnetic field of the solenoid 22 is proportional to the current passing therethrough. The current through the solenoid 22 can be varied to control the force induced, and hence control the amount of axial movement of the member 26. It therefore follows that the solenoid 22 can move the member 26 to any number of axial positions between the first and second axial position.

As described briefly above, the second portion 30 of the member forms a 'dual-conical' shape. The member 26 comprises first and second cylindrical sections 32, 34 and a central cylindrical section 36 located between the first and second cylindrical sections. Each cylindrical section extends axially along axis X. The first and second sections 32, 34 are connected to the central section 36 by respective frusto-conical sections 37, 39, having respective frusto-conical surfaces 38, 40. A cross-section of the member 26 at the first section 32 has a first radial size R1, and a cross-section of the member 26 at the second section 34 has a second radial size R2. The frusto-conical sections 37, 39 provide a transition in radial size between the sections 32, 34 and the central section 36 such that a cross-section of the member at the central section has a third radial size R3 which is less than each of the first radial size R1 and the second radial size R2.

The first and second radial sizes R1, R2 are substantially the same size as each other. The first and second radial sizes R1, R2 may be between 1.25 and 5 times the size of R3, for example 2 times the size of R3.

The second section 20 of the cavity 16 has a constant radial size which is only slightly larger than the shared first and second radial size R1, R2, such that the end sections 32, 34 form a sliding, sealing engagement with the valve housing 12 The second portion 30 of the member therefore forms an annular channel 31 between the first and second sections 32, 34 of the second portion 30. The annular channel 31 is at least substantially fluidly sealed against axial fluid flow by the engagement between the member 26 and the valve housing 12 at the first and second sections 32, 34.

Ports 48A, 48B, 48C are formed in the valve housing 12 and extend fully between the outer surface 14 of the valve housing 12 and the cavity 16. The ports 48A, 48B, 48C thereby provide a means of fluid communication into the valve housing 12 from the outer surface 14 to the cavity 16. Respective openings of the ports 48A, 48B, 48C are located in the second section 20 of the cavity 16.

The member 26 is situated in the cavity 16 such that the openings of the ports 48A, 48B, 48C are located axially between the first and second sections 32, 34 of the second portion 30 of the member 26. The openings of the ports 48A, 48B, 48C are therefore in fluid communication with the annular channel 31 formed by the second portion 30 of the member 26.

The ports comprise a supply port 48A, a control port 48B and a return port 48C. The supply port 48A is linked to a supply of fluid (not shown) to communicate fluid from the supply to the annular channel 31. The control port 48B is linked to a downstream component, to communicate fluid from the annular channel to the downstream component. The return port 48C operates to return fluid to a supply or atmosphere.

Figure 4:
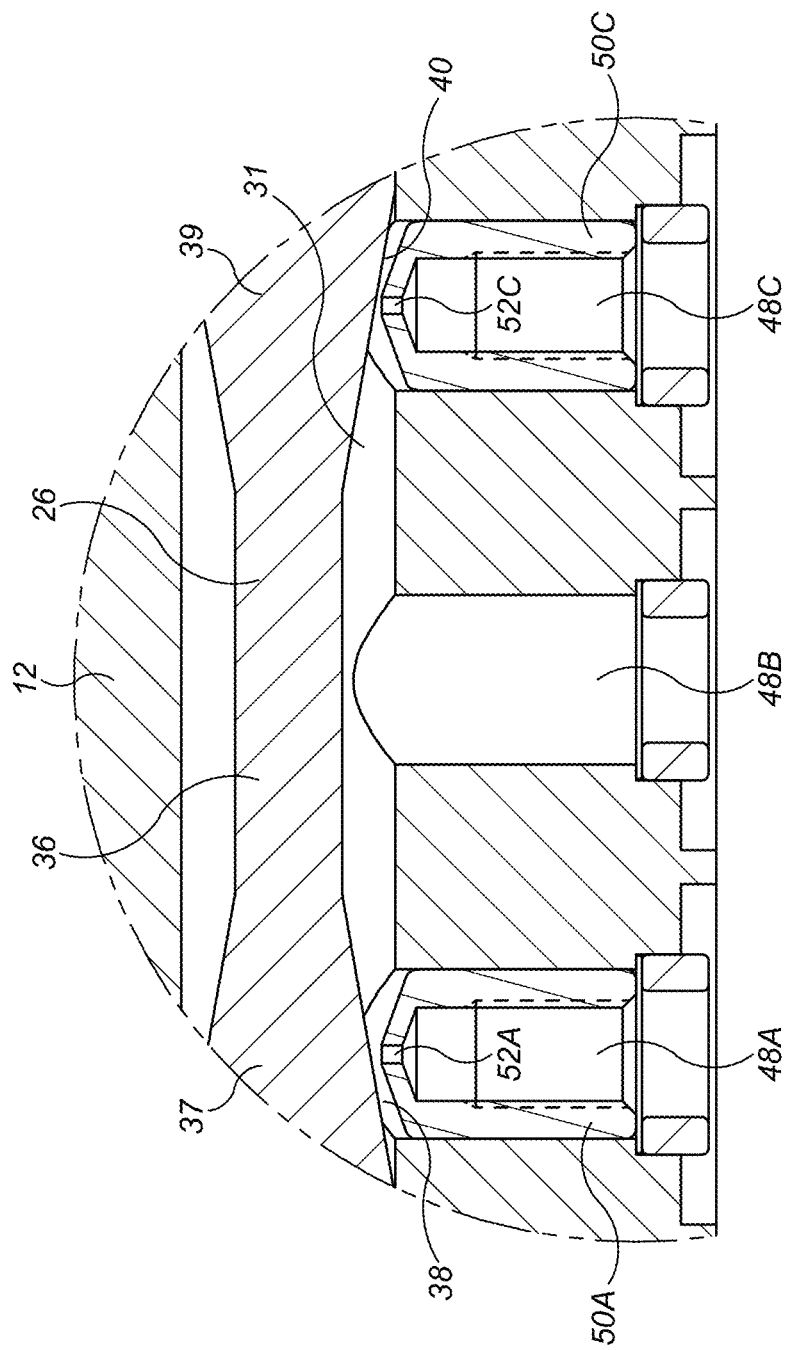
FIG. 4 shows a perspective view of a portion of the servo valve of FIG. 2.

As best seen in FIG. 4, the supply port 48A and the return port 48C comprise respective nozzles 50A, 50C, having respective nozzle openings 52A, 52C. In the first axial position of the member 26, the return port nozzle opening 52C is proximate the second frusto-conical surface 40, which substantially or fully obstructs the nozzle opening 52C. The engagement may fluidly seal the nozzle opening 52C. In the first axial position, the supply port nozzle opening 52A is substantially or fully unobstructed, because the first frusto-conical surface 38 is axially spaced from the supply port nozzle opening 52A in a direction away from the return port nozzle opening 52C.

As the member 26 moves from the first axial position partially towards the second axial position, the second frusto-conical surface 40 moves axially relative to the return port nozzle opening 52C, such that the second frusto-conical surface 40 is further from the return port nozzle opening 52C in a direction away from the supply port nozzle opening 52A, and only partially obstructs the return port nozzle opening 52C, obstructing the return port nozzle opening 52C to a lesser extent than in the first axial position. As such, a partial fluid flow is allowed through the nozzle opening 52C, although the fluid flow is less than if the nozzle opening 52C were substantially or fully unobstructed.

At the same time, the first frusto-conical surface 38 partially engages the supply port nozzle opening 52A in a similar manner as described above, preventing some of the fluid flow therethrough.

As the member 26 moves further from the first axial position fully towards the second axial position, the second frustoconical surface 40 moves further from the return port nozzle opening 52C such that fluid may flow through substantially or fully unobstructed. At the second axial position, the first frusto-conical surface 38 is proximate the supply port nozzle opening 52A and substantially or fully prevents any fluid flow therethrough.

The control port 48B is at least substantially unobstructed independent of the axial position of the member 26.

The operation described above allows the control of fluid through the respective ports 48A, 48B, 48C by controlling an axial position of the member 26 using the solenoid 22. As described above, the member 26 can be moved, in a continuous manner, to any axial position between the first and second axial positions; hence, fluid flow through the ports 48A, 48B, 48C can be controlled to provide partial flow through the supply and/or return ports 48A, 48C.

The described valve provides a means for selectively controlling fluid flow using a desirably simplified construction. For example, a one-piece member may be used to reduce the connections required between parts.

The simple construction of the present disclosure also reduces the need to cut air gaps between components.

The member 26 of the present arrangement fulfils the role of the flapper of the prior-art valve; however, by comparison, the member 26 of the present valve 10 requires relatively little calibration.

Returning to FIG. 2, it may be desirable to more effectively seal the annular channel 31 formed by the member 26 to prevent any fluid encroachment through the cavity openings 16a, 16b. As described above, this might be partially achieved by matching the size of sections 32, 34 of the second portion 30 with a size of the second section of the cavity. However, O-ring seals 54 might also be provided on axially opposed sides of the annular channel 31 (proximate the sections 32, 34 of the second portion 30), sealingly engaging the member 26 and the surrounding valve housing 12 and providing additional sealing of the annular channel 31.

Sealing prevents fluid encroachment out of the cavity 16, and additionally prevents undesirable entry of contaminants into the interior of the valve 10. However, the sealing provided by the size-matching of the member 26 and cavity 16, and/or by the O-ring seals 54, does not prevent contamination of exterior components such as the solenoid 22 and the spring assembly 42.

Figure 5:
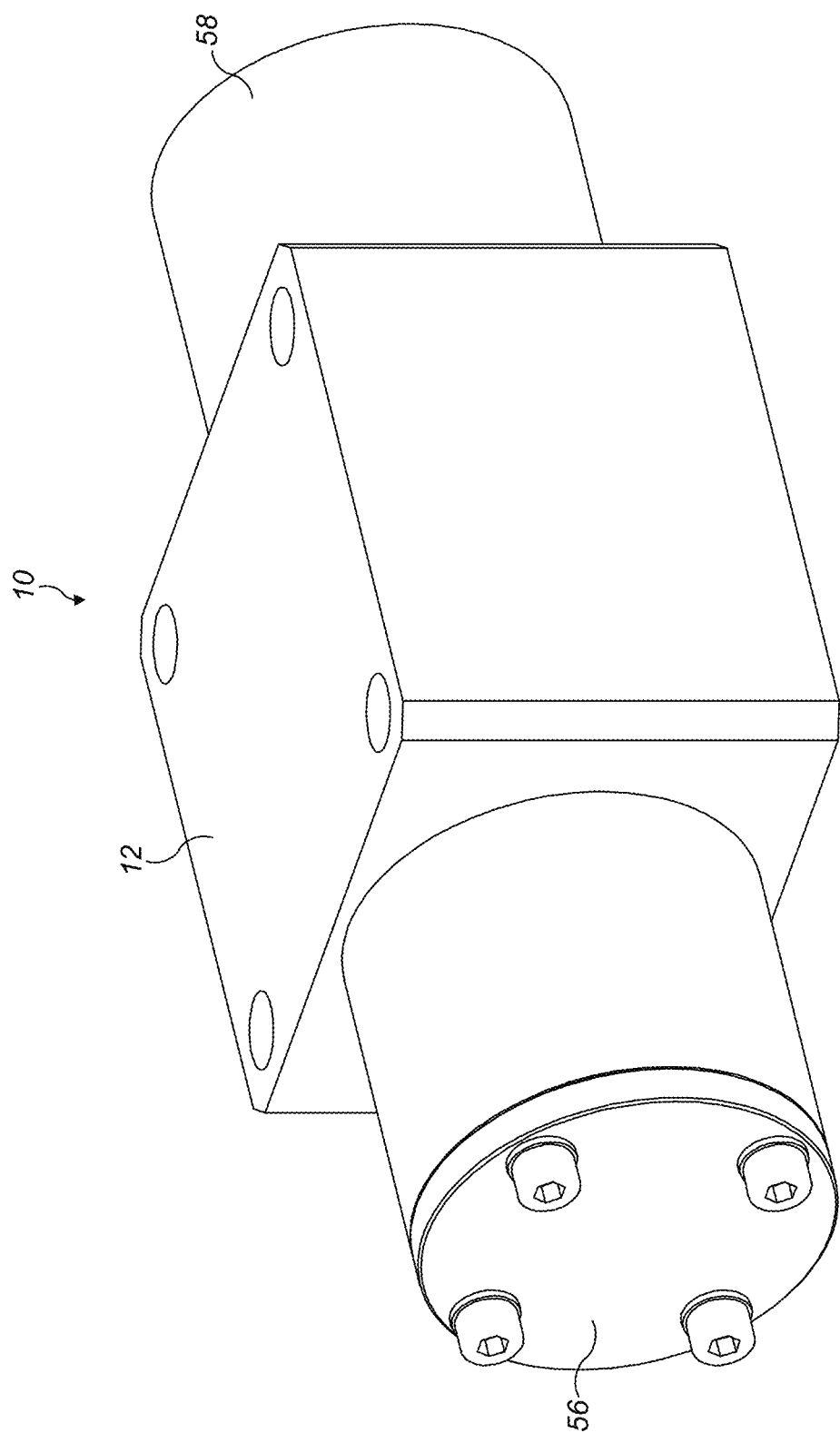
FIG. 5 shows a perspective view of the servo valve of FIG. 2.

To this end, cover-plates 56, 58 may be provided at the axial ends of the valve housing 12a, 12b, as best seen in FIGS. 3 and 5. A first, radially-extending, cover-plate 56 seals the first opening of the cavity 16a, to seal in the solenoid 22. A second cover plate 58 forms a 'bucket' shape, having an axially-extending component 58a and a radially-extending component 58b. The axially-extending component 58a extends from the second axial end of the valve housing 12b, to a point axially beyond the extent of the spring assembly 42. The radially-extending portion 58b is located at said point so that the second cover plate 58 encompasses the spring assembly 42.

The first and/or second cover plates 56, 58, may be secured to the valve housing 12 by any known means, for example by a nut and bolt connection as shown.

The ports 48A, 48B, 48C may be provided with respective screen filters 49A, 49B, 49C to help prevent contaminants from entry into the valve 10 via any of the ports.

In an embodiment, the above-described valve 10 may be used as part of a fuel-metering system, where the fluid passing through the valve is a fuel, the supply is a fuel supply, and the downstream component is a part of an engine requiring fuel.

In an alternative embodiment, the above-described valve 10 may be part of a pneumatic system, where the fluid passing through the valve is air, the supply is an air supply, and the downstream component is an pneumatic actuator.

The valve 10 may be provided as part of an engine for an aircraft, or in an aircraft control surface, for example.

The invention claimed is:

1. A servo valve comprising:
  a valve housing;
  a cavity formed in the valve housing and defining a longitudinal axis (X); and
  a member disposed in the cavity and axially-moveable therein, the member comprising:
    first and second cylindrical sections having a first radius (R1, R2);
    a central cylindrical section located between the first and second cylindrical sections and having a second radius (R3) smaller than the first radius (R1, R2); and
    first and second frusto-conical sections connecting the first and second sections to the central section and forming respective first and second frusto-conical surfaces,
  wherein the member defines an annular channel radially between the member and the valve housing, and the annular channel is bounded by the first and second cylindrical sections,
  wherein the valve housing comprises a plurality of ports, each forming a fluid passage through the valve housing in fluid communication with the annular channel, the plurality of ports comprising first and second ports each defining a diameter and having first and second nozzles with first and second nozzle openings for providing fluid, wherein the first and second nozzle openings each having diameters smaller than the diameter of their respective port, wherein, in a first axial position of the member the second nozzle opening is at least partially engaged with and at least substantially obstructed by the second frusto-conical surface and the first nozzle opening is at least substantially unobstructed by the first frusto-conical surface, and in a second axial position of the member the first nozzle opening is at least partially engaged with and at least substantially obstructed by the first frusto-conical surface and the second nozzle opening is at least substantially unobstructed by the second frusto-conical surface.

2. The servo valve of claim 1, further comprising a solenoid having a central opening extending axially therethrough, the member comprising a further portion extending axially into the central opening, wherein the further portion comprises a ferromagnetic material such that actuation of the solenoid is causes an axial movement of the member.

3. The servo valve of claim 2, wherein the cavity comprises a first cavity section axially adjacent to a second cavity section, the solenoid is disposed in the first cavity section and the member portion is disposed in the second cavity section, the cavity defines a first opening at a first axial end of the valve housing, and the valve further comprises a first cover plate sealing the first opening.

4. The servo valve of claim 2, further comprising a spring assembly on an axially-opposed side of the member portion to the solenoid, the spring assembly having a spring member secured to an end of the member, and a retaining member securing the spring member to the valve housing by a nut-and-bolt connection.

5. The servo valve of claim 4, wherein the valve housing has a second axial end, the spring assembly disposed axially adjacent to the second axial end at an exterior of the valve housing and secured to an outer surface thereof, the valve further comprising a second cover plate with an axially-extending portion extending axially beyond the spring assembly and a radially-extending portion.

6. The servo valve of claim 1, wherein the cavity defines a cross-section with a constant radial size and the first and second cylindrical sections of the member portion are slideably engaged to the valve housing within the cavity.

7. The servo valve of claim 6, further comprising O-ring seals disposed around the first and second cylindrical sections of the member portion to sealingly engage the member and the valve housing.

8. The servo valve of claim 1, wherein one or more of the ports comprises a screen filter.

9. The servo valve of claim 1, wherein the valve is a fuel supply valve.

10. The servo valve of claim 1, wherein the valve is a pneumatic control valve.

11. The servo valve of claim 1, wherein the plurality of ports are substantially perpendicular to the longitudinal axis (X) and/or extend parallel to each other.

12. The servo valve of claim 1, wherein the plurality of ports comprises a third port located axially between the first and second ports.

13. A method of repairing a valve system comprising:
removing an existing valve; and
fitting the valve of claim 1.

* * * * *